(12) United States Patent
Blanco et al.

(10) Patent No.: US 7,340,488 B2
(45) Date of Patent: Mar. 4, 2008

(54) CONFLICTLESS REPLICATION IN A MULTI-MASTER DIRECTORY SYSTEM

(75) Inventors: Marcos Ares Blanco, Saint Martin d'Heres (FR); Joseph Reveane, Saint Bernard du Touvet (FR)

(73) Assignee: Sun Microsystems, Inc., Santa Clara, CA (US)

( * ) Notice: Subject to any disclaimer, the term of this patent is extended or adjusted under 35 U.S.C. 154(b) by 598 days.

(21) Appl. No.: 10/837,316

(22) Filed: Apr. 30, 2004

(65) Prior Publication Data

US 2004/0230615 A1  Nov. 18, 2004

(30) Foreign Application Priority Data

May 15, 2003  (FR) .................................. 03 05837

(51) Int. Cl.
*G06F 17/30* (2006.01)
*G06F 15/00* (2006.01)

(52) U.S. Cl. ..................... 707/201; 707/101; 707/202; 707/203; 715/511

(58) Field of Classification Search ................ 707/100, 707/101, 203, 204, 8, 201, 202; 715/511
See application file for complete search history.

(56) References Cited

U.S. PATENT DOCUMENTS

| | | | |
|---|---|---|---|
| 6,247,017 B1 | 6/2001 | Martin | |
| 6,256,634 B1 * | 7/2001 | Moshaiov et al. | 707/100 |
| 6,301,589 B1 | 10/2001 | Hirashima et al. | |
| 6,374,262 B1 * | 4/2002 | Kodama | 707/201 |
| 6,523,032 B1 * | 2/2003 | Sunkara et al. | 707/8 |
| 6,615,223 B1 | 9/2003 | Shih et al. | |
| 7,260,589 B2 * | 8/2007 | Cotner et al. | 707/202 |
| 2001/0027445 A1 | 10/2001 | Eichelsdoerfer et al. | |
| 2002/0064149 A1 * | 5/2002 | Elliott et al. | 370/352 |

(Continued)

FOREIGN PATENT DOCUMENTS

EP  716 382  6/1996

OTHER PUBLICATIONS

Petr Matousek, "LDAP Replication at CRN," CERN—IT Division, Jul. 29, 1998, (16 Pages).

(Continued)

*Primary Examiner*—Shahid A Alam
(74) *Attorney, Agent, or Firm*—Robert C. Kowert; Meyertons, Hood, Kivlin, Kowert & Goetzel, P.C.

(57) ABSTRACT

A directory server system may include master servers and a non-master server, each server storing directory server data that includes updates, each update having a creation time. The master servers exchange replicate updates through update communications. Each master server may include an update state builder for maintaining local update state items including an estimate time indication related to update communications received by the local master server about the directory server data stored by the designated master server. A master server may also include an upper time builder for evaluating an upper time value that is the earliest one of the estimate time indications in the local update state items. A master server may also include a master-to-non-master replicate function, for sending to the non-master server the updates in the local directory server data which have an associated creation time no later than the upper time value.

27 Claims, 15 Drawing Sheets

U.S. PATENT DOCUMENTS

2003/0088587 A1  5/2003  Merrells et al.
2003/0088615 A1  5/2003  Good et al.
2004/0230619 A1  11/2004  Blanco et al.

OTHER PUBLICATIONS

Search Report under Section 17, Application No. GB0409228.4, Jul. 12, 2004, 1 page.

* cited by examiner

| Attribute type 400 | Attribute value 402 |
|---|---|
| dn:<br>objectClass:<br>objectClass:<br>objectClass:<br>objectClass:<br>cn:<br>sn:<br>uid:<br>mail:<br>phoneNumber: | uid=Joe, ou=people, dc=france, dc=sun, dc=com<br>top<br>person<br>organizationalPerson<br>inetOrgPerson<br>Joe<br>Rayan<br>joerayan<br>joerayan@sun.com<br>778 |

Entry 404

*FIG. 5*
*(PRIOR ART)*

CONFLICTLESS REPLICATION IN A MULTI-MASTER DIRECTORY SYSTEM

This invention relates to distributed computer systems.

In certain fields of technology, complete computer systems, including a diversity of equipments, are optimized for storing and retrieving data. Such systems may provide services to user machines related to a local network, e.g., an Intranet, or to a global network, e.g. the Web network.

It is desirable that network users can access, upon a query, to a large number of data, making it possible for the network users to create their own dynamic web site or to consult a dynamic web site, for example an e-commerce site on a multi platform computer system (Solaris, Windows NT). These queries are directed to a directory, e.g. using the LDAP protocol, and managed by a directory server. It is further desirable that this access to a large number of data be made possible more rapidly for each query arriving after a first query.

A general aim of the present invention is to provide advances in these directions.

Broadly, there is proposed a master server, for use in a directory server system having other master servers and a non-master server, each server being capable of storing directory server data, comprising updates, each update having a creation time. The master servers are capable of exchanging replicate updates through update communications. Each master server comprises:

- an update state builder for maintaining local update state items, each item being associated to a designated master server and comprising an estimate time indication related to update communications received by the local master server about the directory server data stored by the designated master server,
- an upper time builder capable of evaluating an upper time value, said upper time value being the earliest one of the estimate time indications in the local update state items, and
- a master-to-non-master replicate function, capable of sending to the non-master server those of the updates in the local directory server data which meet a time condition, the time condition including an upper time condition which comprises the fact that an update has an associated creation time which is no later than the upper time value.

There is also proposed a method of operating a directory server system, having other master servers and a non-master server. Each server is capable of storing directory server data, comprising updates, each update having a creation time. The master servers are capable of exchanging replicate updates through update communications, each master server comprising local update state items, in which each item is associated to a designated master server and comprises an estimate time indication related to update communications received by the local master server about the directory server data stored by the designated master server, the method comprising the steps of:

a) evaluating an upper time value as the earliest one of the estimate time indications in the local update state items, and b) sending to the non-master server those of the updates in the local directory server data which meet a time condition, said time condition including an upper time condition which comprises the fact that an update has an associated creation time which is no later than the upper time value.

This invention may also be defined as an apparatus or system, and/or as software code for implementing the method, or for use in the system, and/or as portions of such software code, in all their alternative embodiments to be described hereinafter.

Other alternative features and advantages of the invention will appear in the detailed description below and in the appended drawings, in which.

Figure 6A:
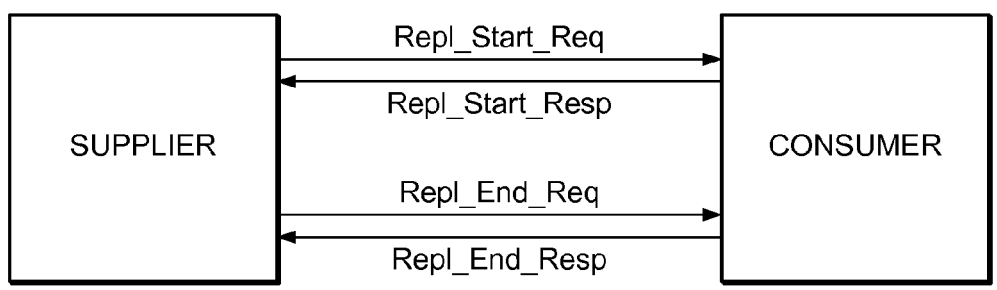
Figure 6B:
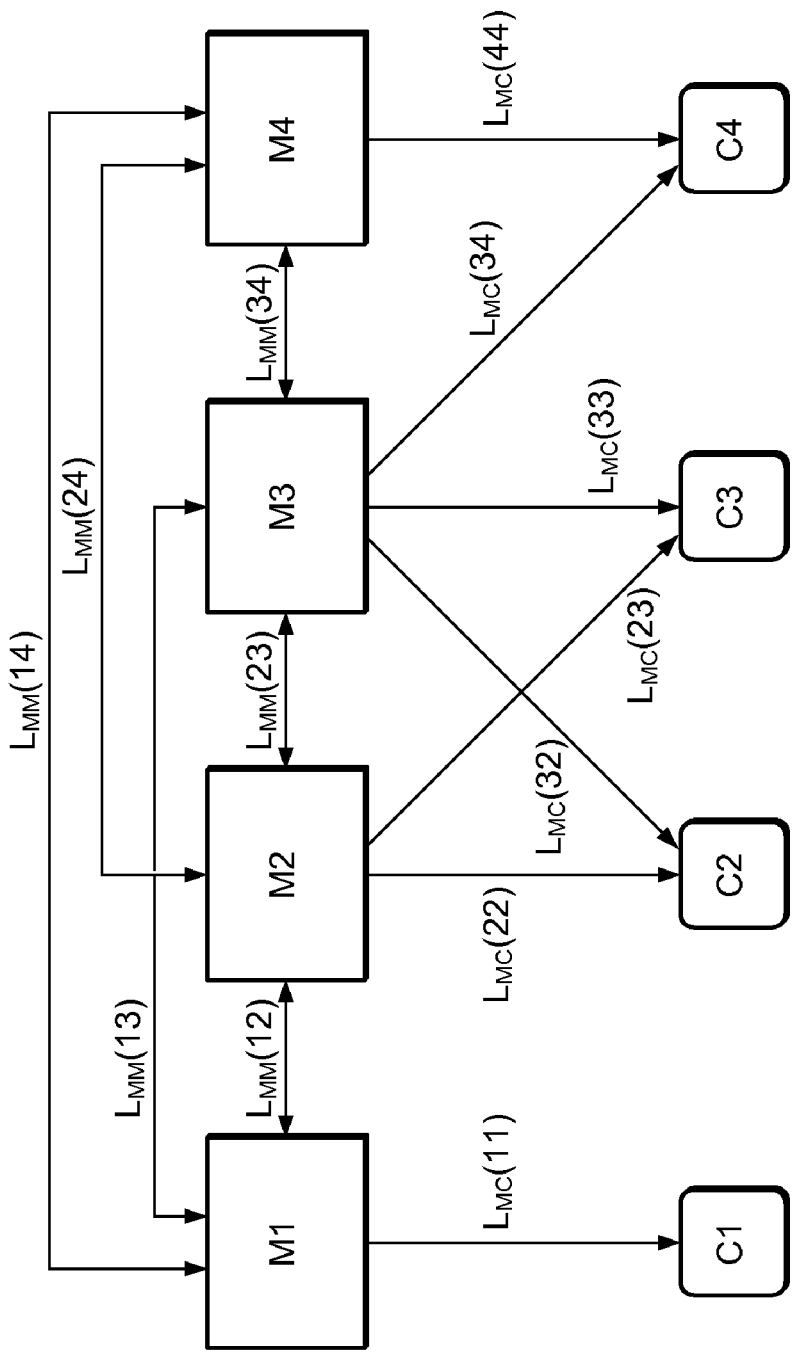
Figure 7:
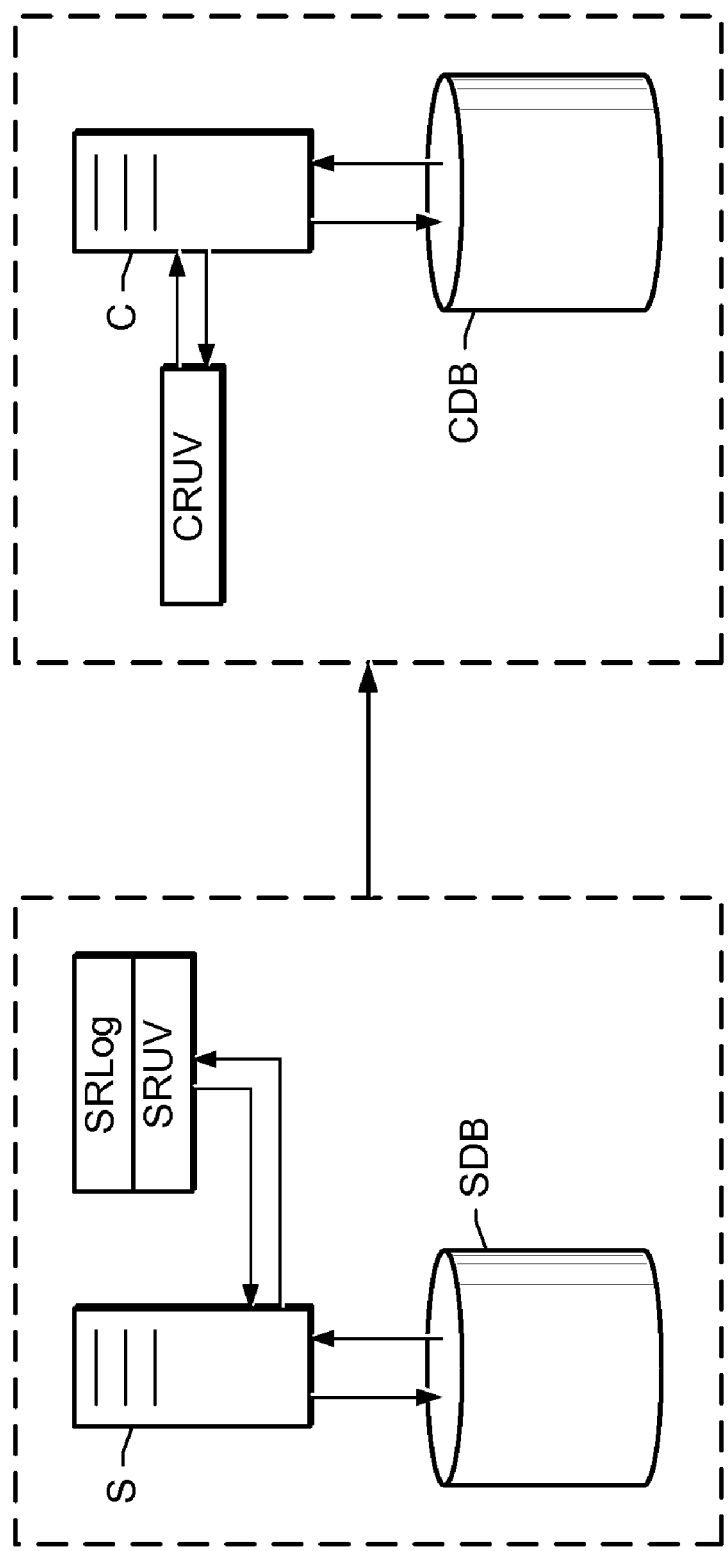
Figure 8A:
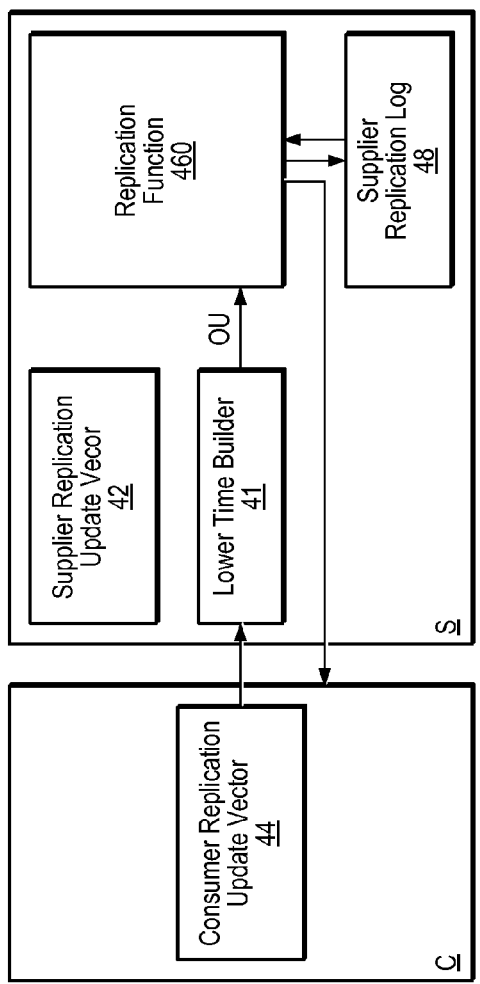
Figure 9:
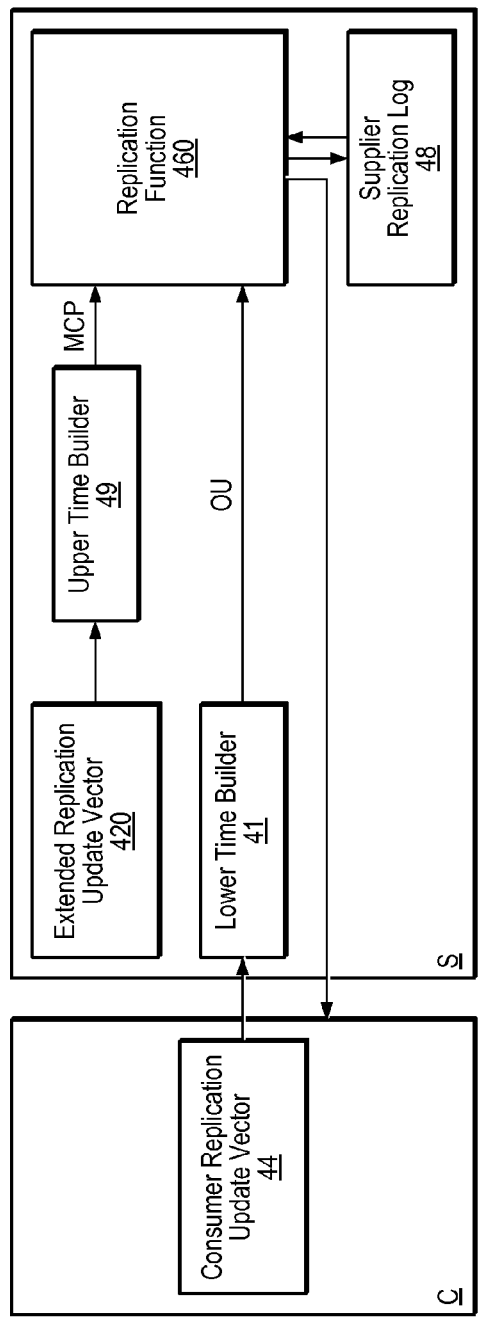
Figure 8B:
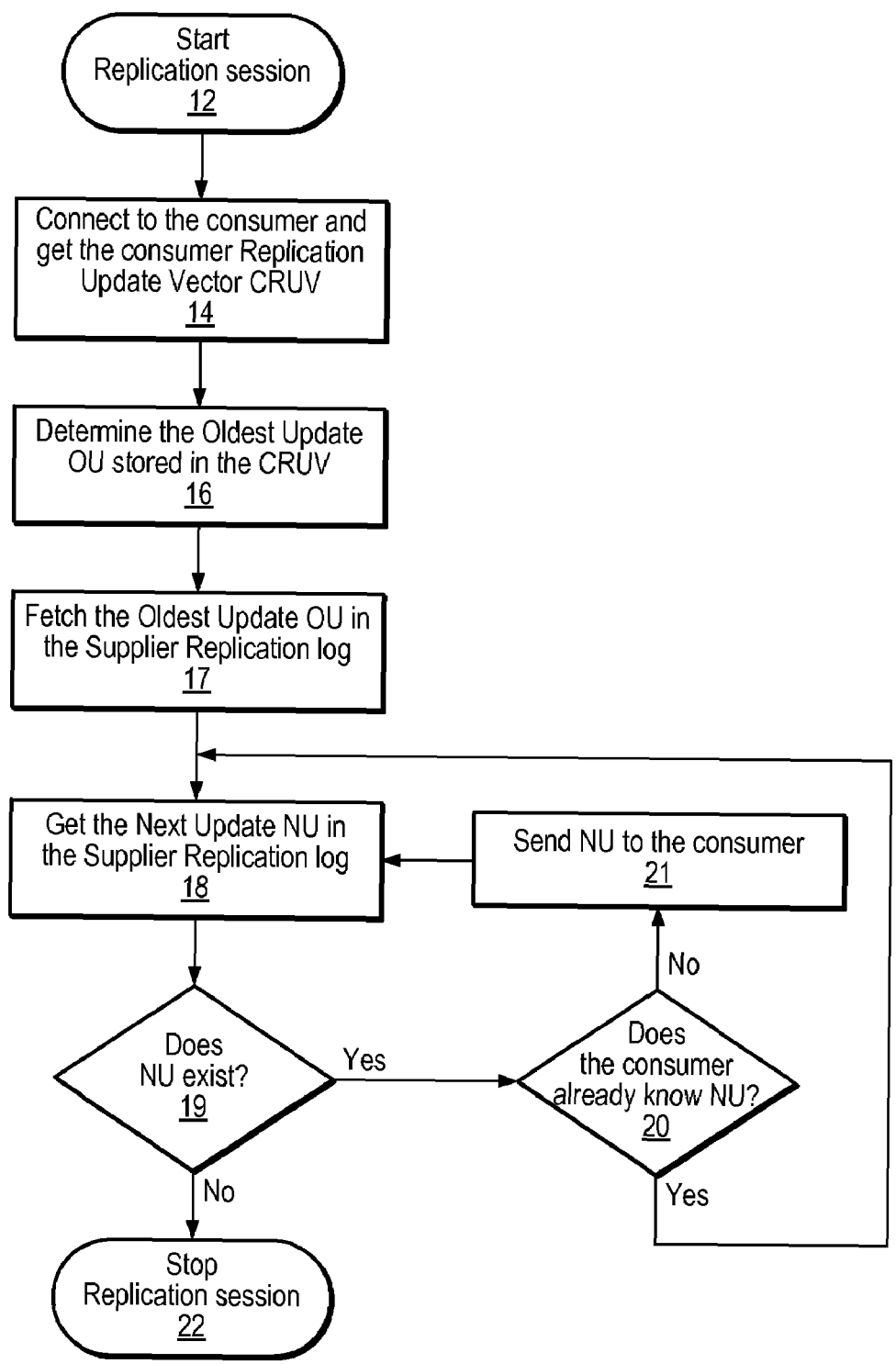
Figure 10:
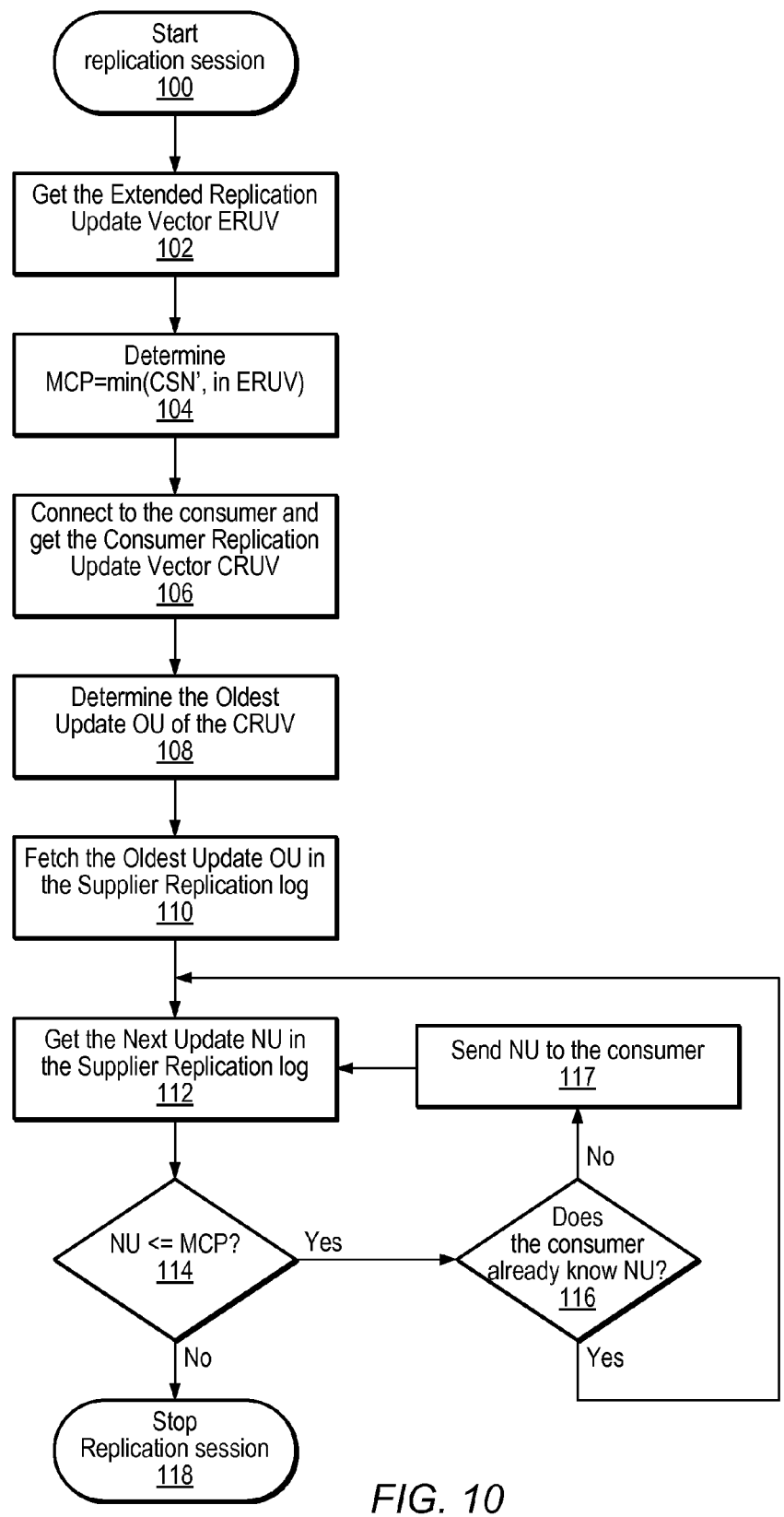
Figure 11:
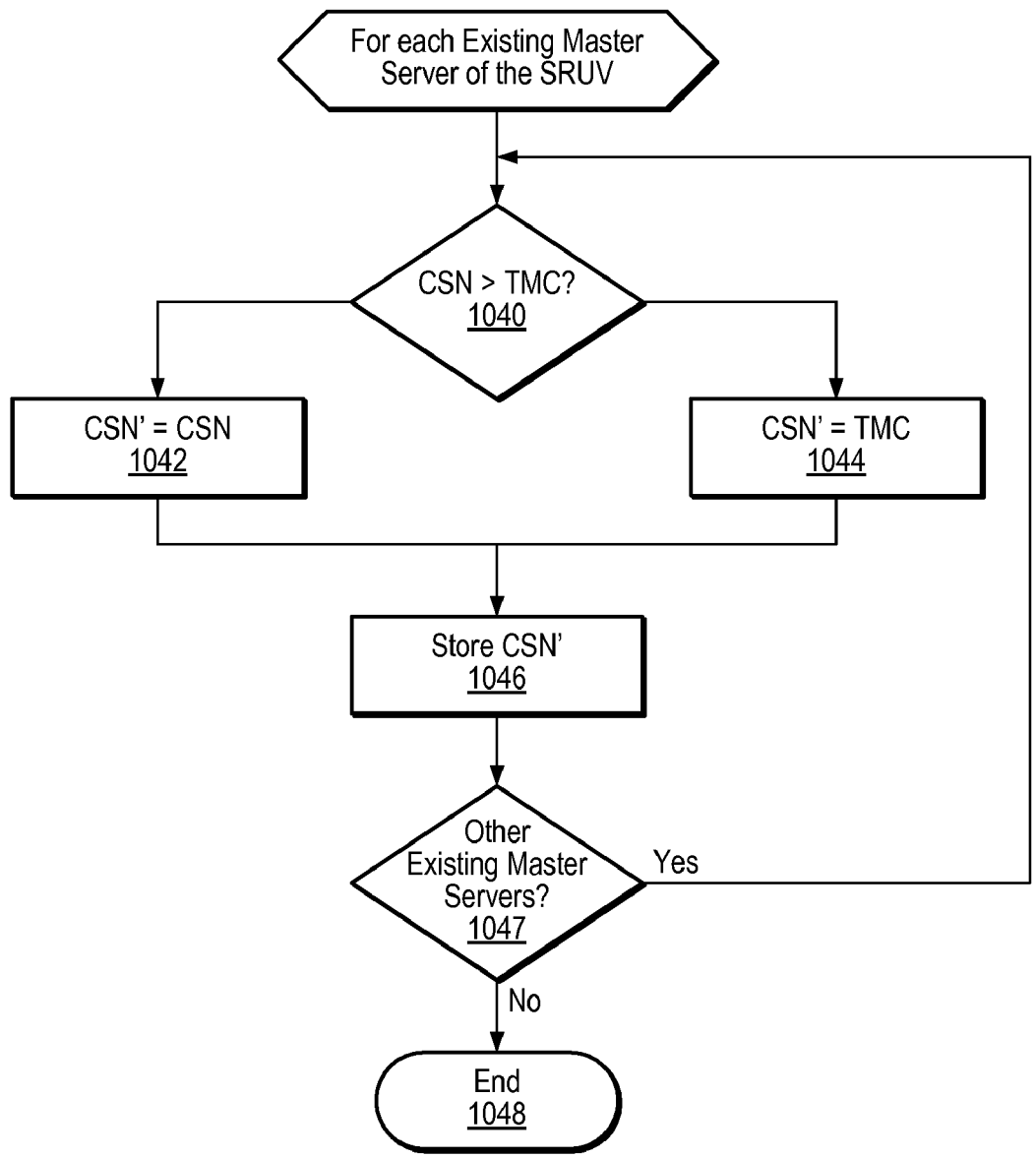
Figure 12:
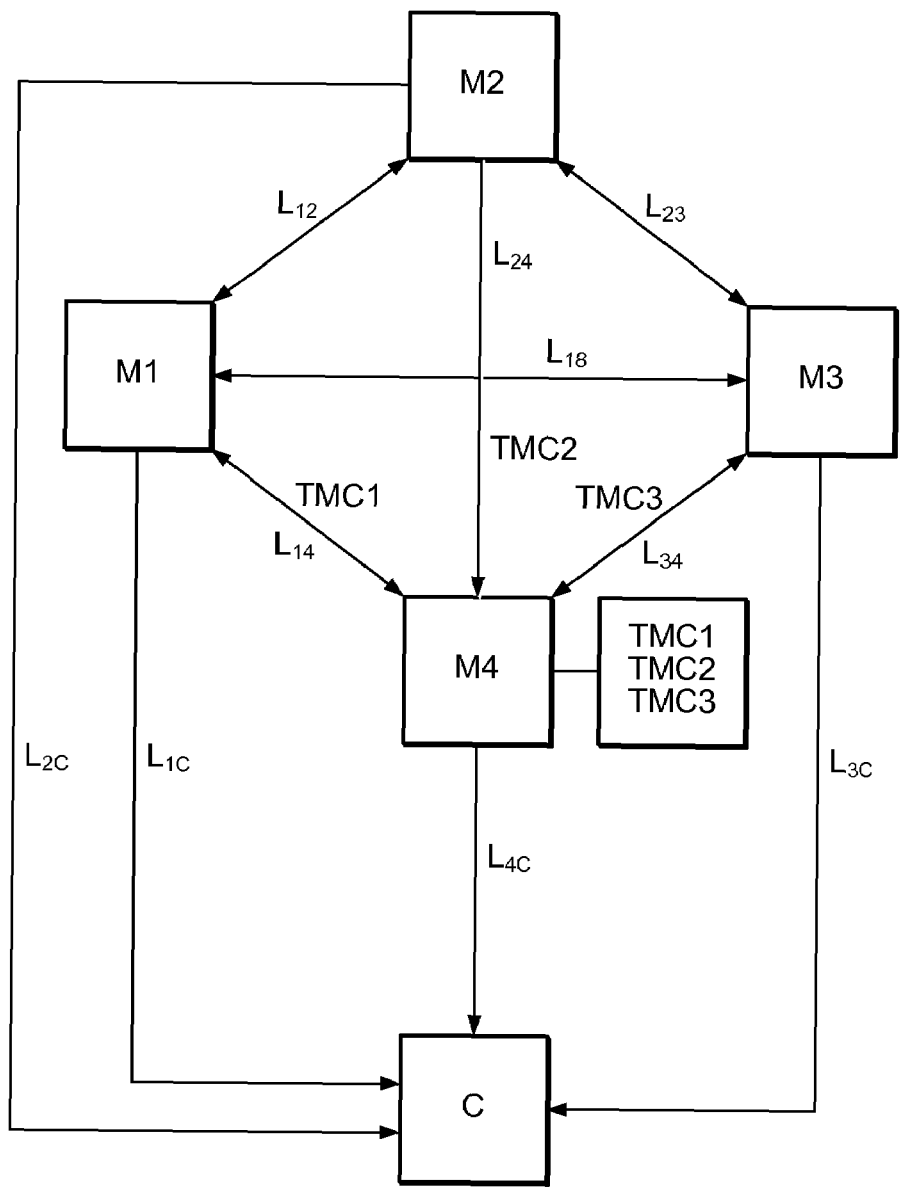
Figure 13:
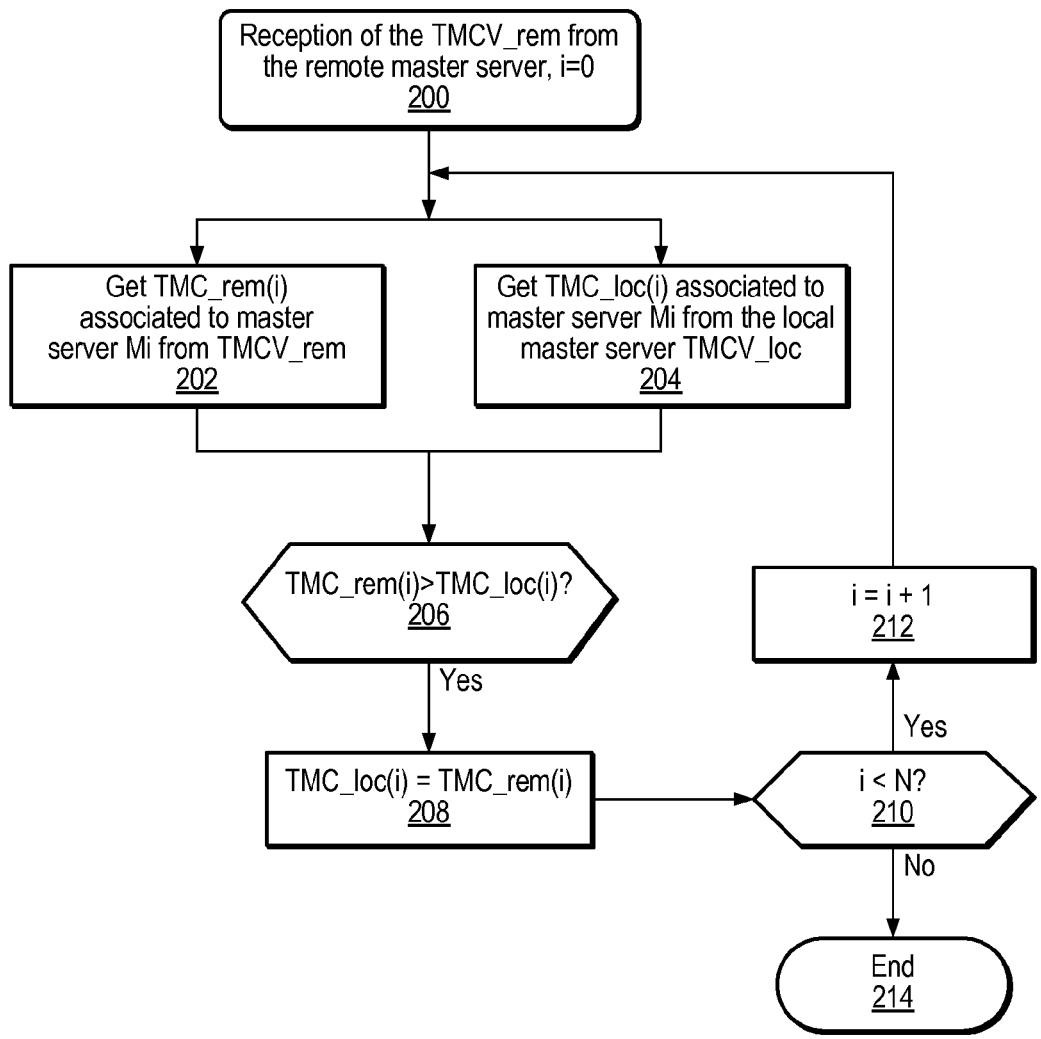
Figure 14:
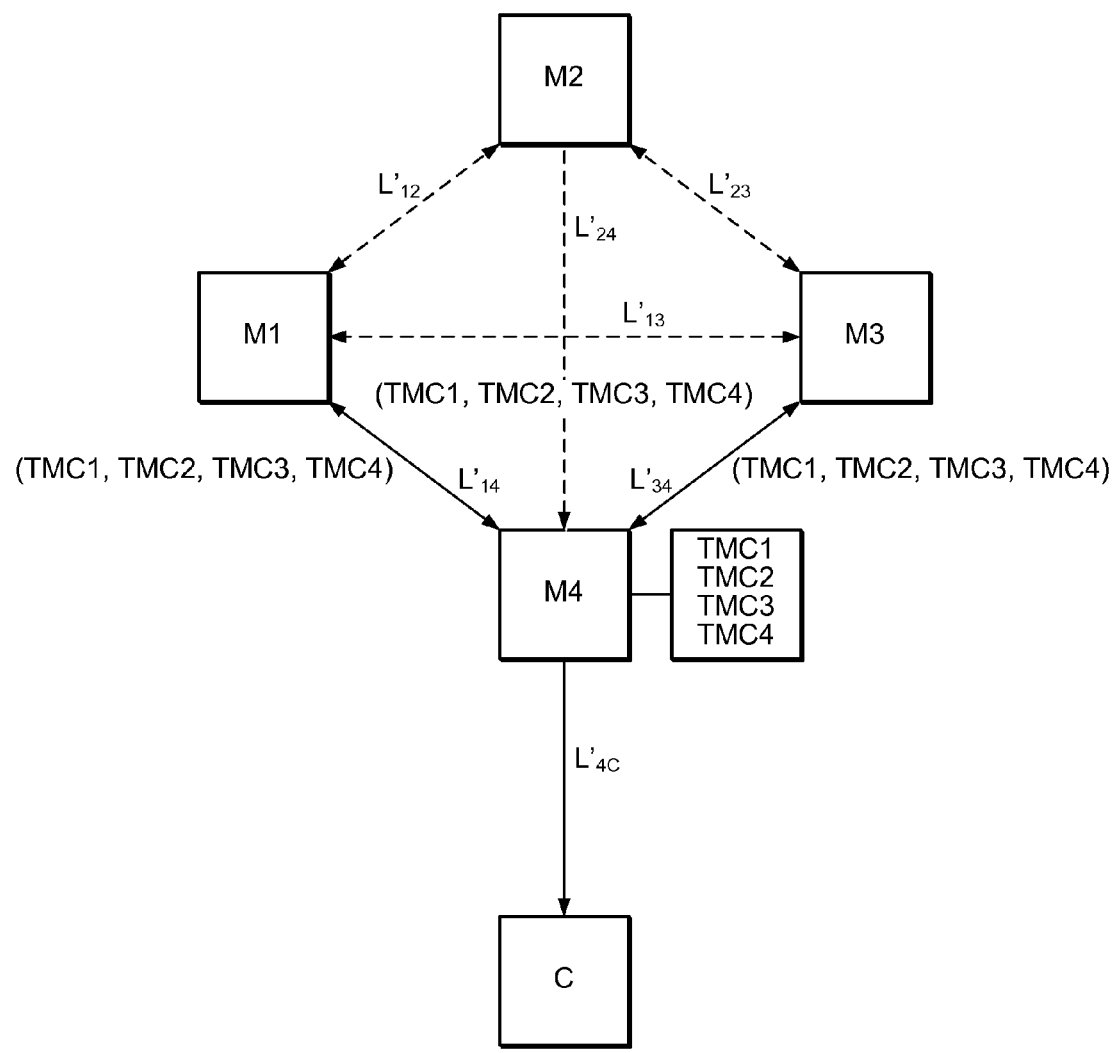

FIG. 5 is an array containing examples of attribute types and values of a LDAP entry, FIG. 6a illustrates a replication session between a supplier and a consumer, FIG. 6b illustrates the general structure of a multi-master directory server system, FIG. 7 represents a master server acting as a supplier for a slave server, in a multi-master directory server system, FIG. 8a is a general diagram illustrating a replication session between a supplier and a consumer, according to the prior art, FIG. 8b is a flowchart representing the operations performed by a master server for replicating updates to a consumer server according to the prior art, FIG. 9 is a general diagram illustrating a replication session between a supplier and a consumer according to the embodiments of the invention, FIG. 10 is a flowchart representing the operations performed by a master server for replicating updates to a consumer server, according to the embodiments of the invention, FIG. 11 is a flowchart representing the operations performed by a master server for determining an extended replication update vector, according to the second embodiment of the invention, FIG. 12 represents an exemplary multi-master topology in which the second embodiment of the invention is implemented, FIG. 13 is a flowchart representing the operations performed by a master server for maintaining second time indications, according to a further alternative of the second embodiment of the invention, and FIG. 14 represents an exemplary multi-master topology in which the further alternative of the second embodiment of the invention is implemented.

Additionally, the detailed description is supplemented with the following Exhibits:

Exhibit E1 contains examples of replication update vectors according to the first embodiment of this invention;

Exhibit E2 contains examples of update vectors according to the second embodiment of this invention;

In the foregoing description, references to the Exhibits are made directly by the Exhibit or Exhibit section identifier: for example, E2.1 refers to section E2.1 in Exhibit E2. The Exhibits are placed apart for the purpose of clarifying the detailed description, and of nabling easier reference.

As they may be cited in this specification, Sun, Sun Microsystems and Sun One are trademarks of Sun Microsystems, Inc.

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Figure 1:
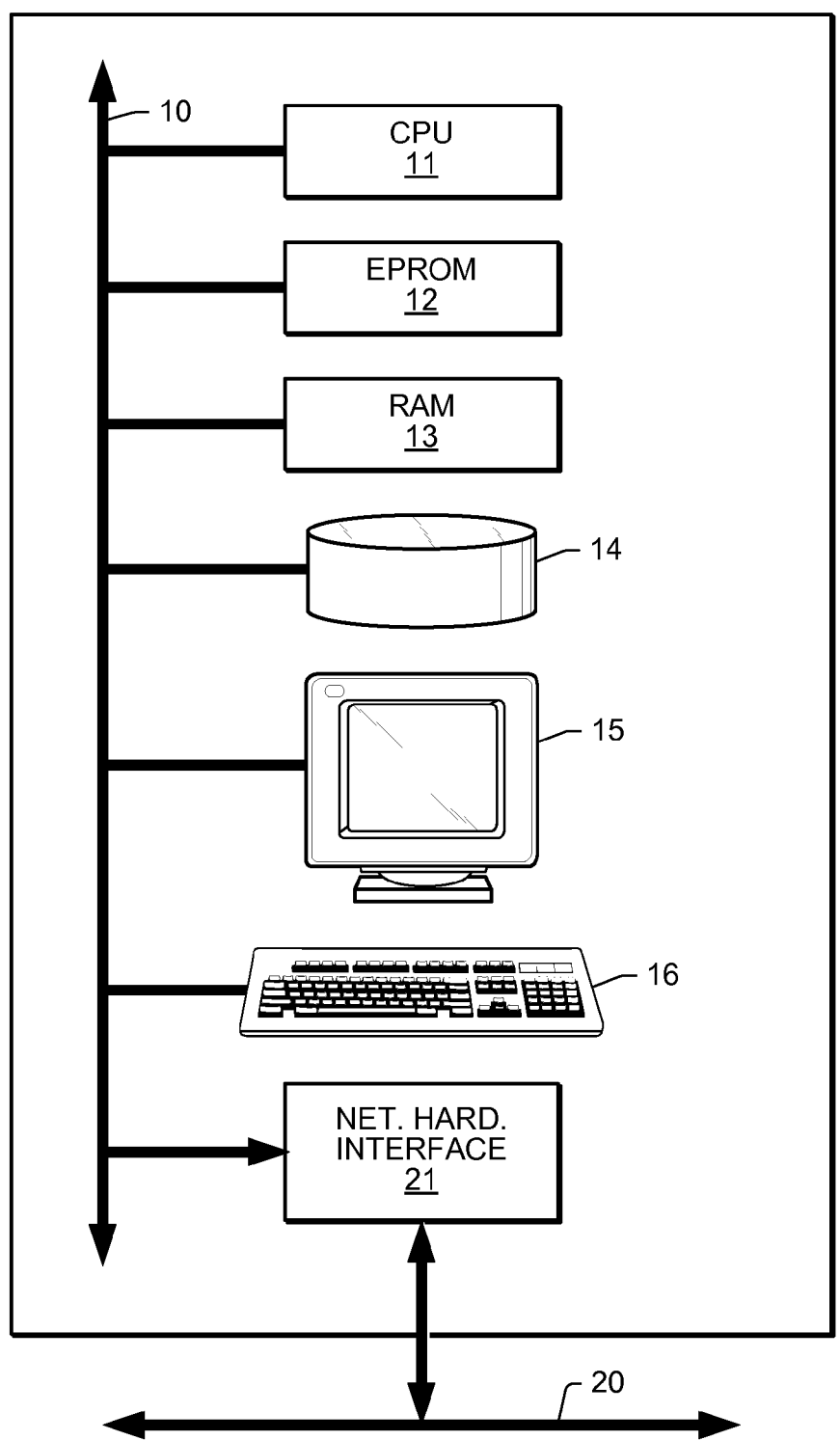
FIG. 1 is a general diagram of a computer system in which the invention is applicable.

This invention may be implemented in a computer system, or in a network comprising computer systems. FIG. 1 represents an example of the hardware of such computer systems. The hardware comprises:

- a processor CPU 11, e.g. an Ultra-Sparc;
- a program memory 12, e.g. an EPROM, a RAM, or Flash memory;
- a working memory 13, e.g. a RAM of any suitable technology;
- a mass memory 14, e.g. one or more hard disks;
- a display 15, e.g. a monitor;
- a user input device 15, e.g. a keyboard and/or a mouse;
- a network interface device 21 connected to a communication medium 20, which is in communication with other computers. Network interface device 21 may be of the type of Ethernet, or of the type of ATM. Medium 20 may be based on wire cables, fiber optics, or radio-communications, for example.

Data may be exchanged between the components of FIG. 1 through a bus system 10, represented as a single bus for simplification of the drawing. Bus systems may include a processor bus, e.g. PCI, connected via appropriate bridges to, e.g. an ISA or a SCSI bus.

The data exchanged are handled by a resource provider using a server to deliver data to user computers, or to store the data provided by the user computers. Browsers, e.g. Internet Explorer, are further provided on user computers, to enable users to make requests, to retrieve or store data. The resource provider makes it possible for user computers on a network to share data of any kind.

iPlanet E-commerce Solutions, now Sun One E-commerce Solutions, has developed a "net-enabling" platform called the Internet Service Deployment Plateform (ISDP). ISDP includes multiple, integrated layers of software that provide a full set of services supporting application development e.g. business-to-business exchanges, communications and entertainment vehicles, and retail Web sites.

Sun One™ Directory Server, provides a centralized directory service directory service for an intranet or an extranet. A directory service represents a collection of software, hardware, and processes that are able to deliver and store information. The directory service generally includes one or more directory client programs that can access the data stored in the directory, e.g. names, phone numbers or addresses.

Sun One Directory Server is a general purpose directory that stores all information in a single, network-accessible repository. Sun One Directory Server provides the standard protocol LDAP and an application programming interface (API) to access the information contained by the Sun One Directory Server.

LDAP is the Internet standard for directory lookups, just as the Simple Mail Transfer Protocol (SMTP) is the Internet Standard for delivering e-mail and the Hypertext Transfer Protocol (HTTP) is the Internet standard for delivering documents. Technically, LDAP is defined as on-the-wire bit protocol (similar to HTTP) that runs over Transmission Control Protocol/Internet Protocol (TCP/IP). It specifies the interaction between clients and servers and determines how LDAP queries and responses are carried over the IP network.

Figure 2:
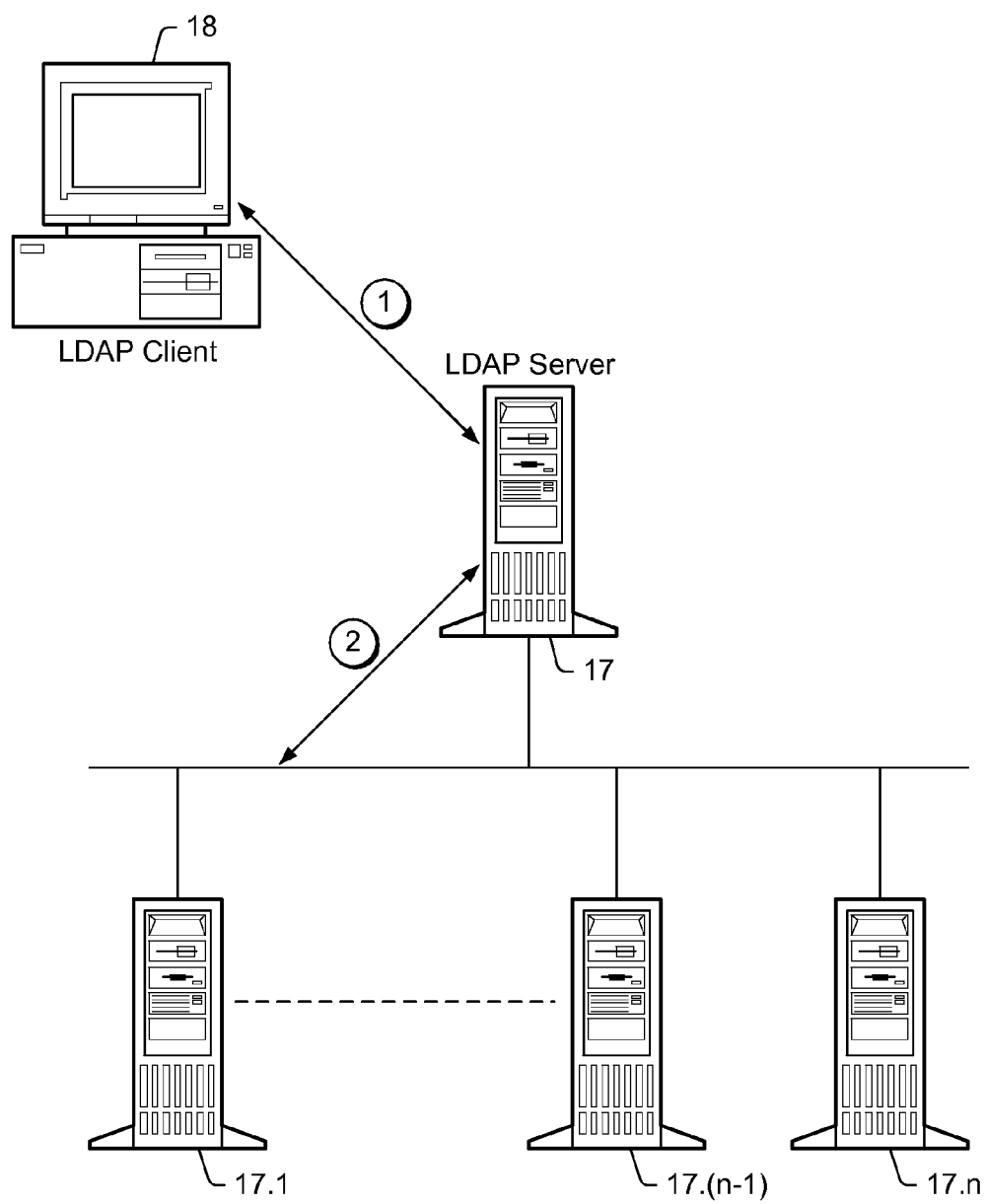
FIG. 2 illustrates a typical LDAP exchange between a LDAP client and LDAP servers.

Referring to FIG. 2, LDAP defines a communication 1 between a server 17 and a client 18. LDAP also defines a communication 2 between LDAP server 17 and servers 17.1 to 17.n, which makes it possible for the server LDAP 17 to exchange its content (replication service) with servers 17.1 to 17.n or to access the directory of one of the servers 17.1 to 17.n (referral service) and vice versa.

The LDAP protocol is a message-oriented protocol. The client 18 constructs an LDAP message containing a request and sends the message to the server 17. The server 17 processes the request and sends a result, or results, back to the client 18 as a series of LDAP messages.

Such a client-server communication additionally lies on specific architecture. LDAP creates a standard defining the way data are exchanged between the client computer and the directory servers and defining the way data are modeled. More specifically, LDAP relies on four basic models:

- an information model;
- a naming model;
- a functional model; and
- a security model.

The LDAP information model defines the kind of data that can be stored in a directory. LDAP directory is populated with entries. An entry corresponds to real-world objects, such as a person, a printer, or configuration parameters.

Figure 3:
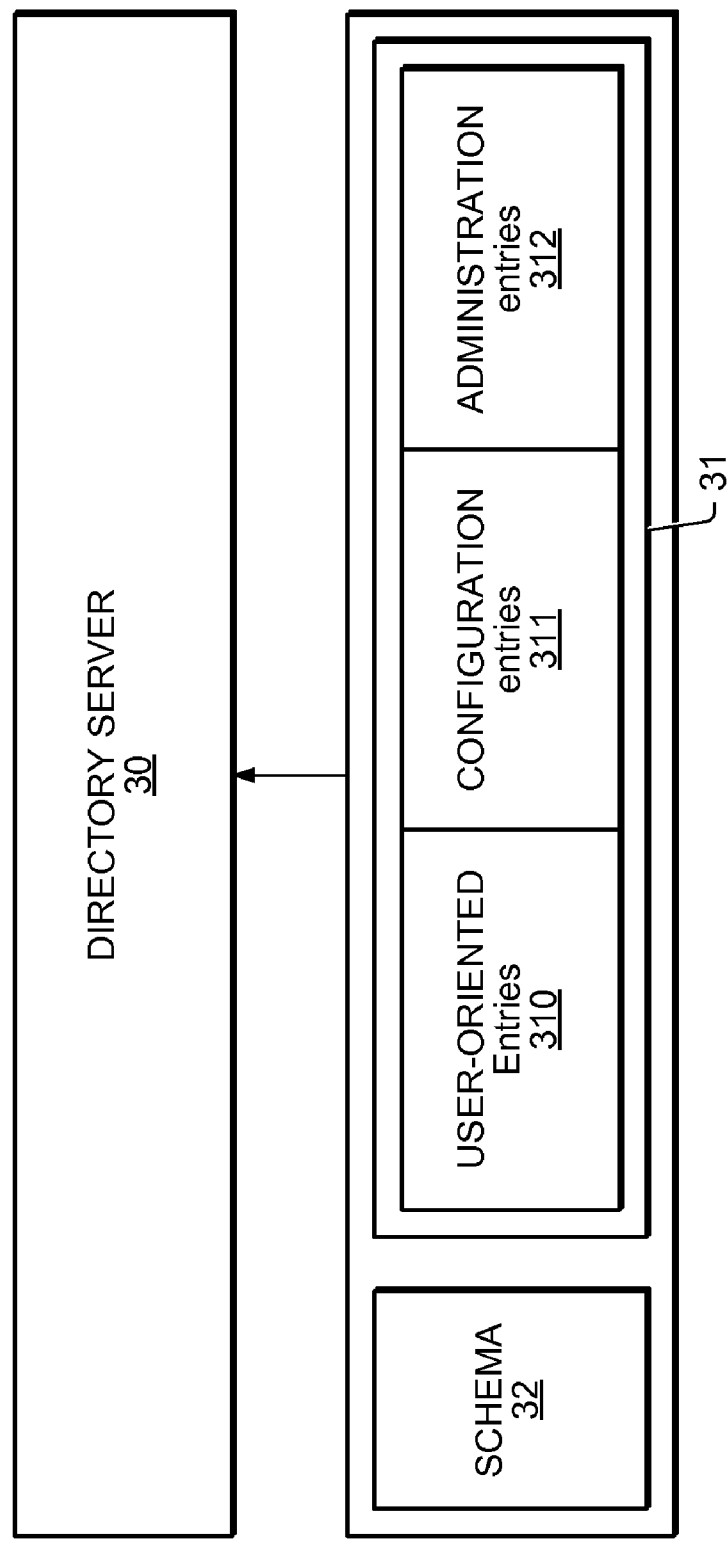
FIG. 3 illustrates the general structure of a LDAP directory system.

FIG. 3 illustrates the general structure of a LDAP directory. The directory server 30 executes implemented functions based on the entries 31 stored in databases. The entries comprise configuration entries 310, user entries 311 and administrative entries 312. These entries further interact with the schema 32 described below. The configuration entries are stored under the subtree "cn=config". The user entries comprise data related to the users of the directory server. Administrative entries relate to user management and are generally implemented as LDAP subentries.

An entry contains a set of attributes associated with values. Each entry is uniquely identified by a distinguished name. The distinguished name may be stored in the dn attribute (distinguishedName).

Figure 4:
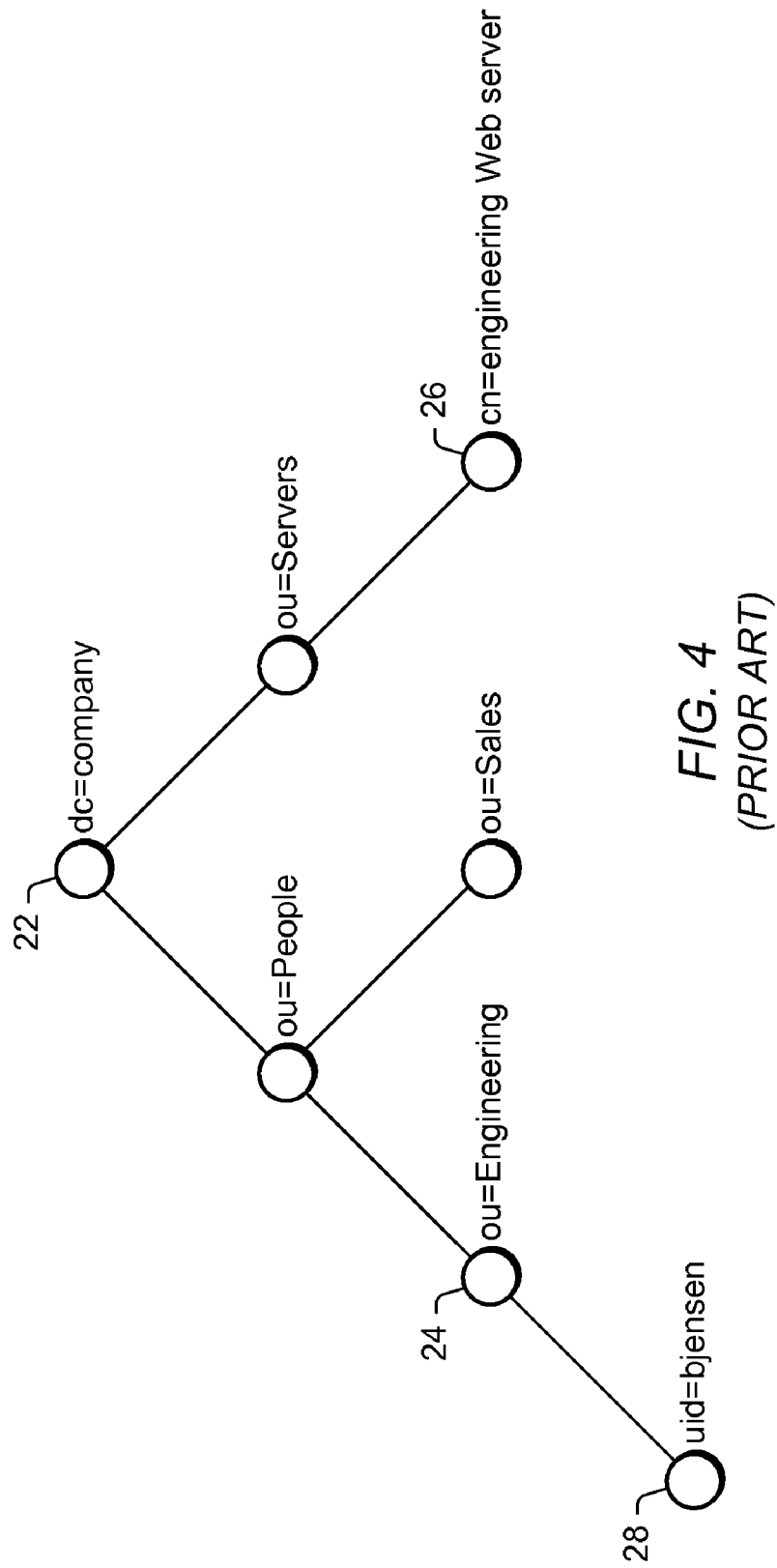
FIG. 4 shows a portion of a LDAP tree.

LDAP entries are organized in a hierarchical tree structure, called the Directory Information Tree (DIT). Each node of the tree comprises an entry. FIG. 4 illustrates an organization entry (22) with the attribute type of domain component dc, an organizational unit entry (24) with the attribute type of organizational unit ou, a server application entry (26) with the attribute type of common name cn, and a person entry (28) with the attribute type of user ID uid. The entries are connected by the directory. Each server has a particular entry called root directory specific entry (rootDSE) which contains the description of the tree and of its content.

Descriptive information is stored in the attributes of the entry. Each attribute describes a specific type of information. Attributes may have constraints that limit the type and length of data placed in attribute values.

The LDAP naming model specifies that directory entries must be hierarchical and organized in an inverted tree structure. As mentioned above, each entry has a unique name called a distinguished name dn. The dn consists of a list of the names of all the parent entries in the directory back to the top of the directory hierarchy, the name of the entry being at the extreme left, e.g., "uid=Joe,ou=people,dc=france,dc=sun,dc=com", in FIG. 5. The root of the entry is at the extreme right of the dn. The name at the extreme left of the dn, "uid=Joe" in the example, is the relative distinguished name or rdn. Within a set of entries sharing the same parents, the rdn must be unique. This ensures that two entries in the directory tree cannot have the same dn.

The LDAP functional model comprises several basic functional operations (indicated thereinafter between the quote signs " ") that a user from a client computer can perform on the directory data of a LDAP directory server. In particular, the operations "add", "delete", and "modify" allow the update of specific entries.

LDAP also provides a replication mechanism to increase the availability and performance of the directory.

Replication allows the same information to exist on more than one server. Each server in a directory server system interacts with a database in which directory server data are maintained. A database which participates in replication form a replica.

A replica can be either a read-write replica or a read-only replica. A read-write replica contains master copies of directory information and can be updated. A read-only replica refers all update operations to read-write replicas. A server can hold any number of read-only or read-write replicas.

A master server holds a read-write replica which is copied to a replica on a different server. A non-master server or slave server holds a read-only replica which is copied from a master server.

A replication session may not only occur between a master server and a slave server but also between two master servers, in certain network topologies.

In a replication session among two servers, the server which holds a replica that is copied to a replica on the other server is called a supplier for that replica and the server which holds a replica that is copied from the other server is called a consumer for that replica.

More specifically, replication is a process by which updates performed by a master server are propagated to all the replicas. A master server can replicate an entire naming context, a subtree, or a particular entry. A master server can also replicate the entire content of an entry, or a subset of attributes to be replicated.

Replication significantly reduces the load of processing requests generated by directory service clients because several servers share the same information, and has the following advantages:

It reduces the load on a master server by diverting some traffic to other servers;
It allows to store copies of data where they are most frequently used, reducing network traffic; and
It allows to store many copies of the data.

Sun One™ Directory Server system supports multi-master replication topology in which master copies of the same information can exist on several servers or master servers.

A LDAP multi-master topology is a set of LDAP servers fully or partially meshed among them that collaborate to offer a logically global view to external clients. An external client can launch an update request to any master server of the multi-master topology.

The updates that are locally performed on a master server are then replicated to the other master servers. Therefore, in multi-master topology, a master server can be a supplier or a consumer server. A Supplier server is the source of the updates to be transferred. A Consumer server is the recipient of the updates.

A master server also replicates updates to several slave servers which maintain a read-only replica. Slave servers are only consumer servers.

The replication session may be initiated by the supplier, in which case the supplier starts the replication session by opening a connection to the consumer. The supplier binds using the authentication credentials provided in a replication agreement.

A supplier-initiated replication session will be described below, in reference to FIG. 6a.

The supplier initiates a replication session with a consumer connected thereto by sending a replication start request Repl_start_Req to the consumer. The parameters of the replication start request identify the replication agreement associated with the session, the update transfer protocol associated with the replication session, and other state information required to initiate the replication session.

The consumer then sends back a replication start response Repl_start_Resp to the supplier. The parameters of the replication start response include a response code, and an optional update vector.

Afterwards, the supplier sends selected updates through a number of request/response exchanges with the consumer. The update transfer protocol defines the mechanisms for the consumer to receive selected updates based on the current state of replication represented in an update vector.

Upon sending all the selected updates to the consumer, the supplier sends a replication end request Repl_end_Req to the consumer.

In return, the consumer sends back a replication end response Repl_end_Resp to the supplier.

The purpose of the replication end request and the replication end response is to secure the state of the update vectors associated with the two replicas which participate to replication.

Upon terminating a replication session, the supplier can either start a new replication session or release its binding to the consumer.

Client updates inside a LDAP multi-master topology can happen in any master server of the topology at any moment.

However, two different updates on the same data generated in two distinct master servers may become conflicting. Therefore, when the updates are replicated, the server which receives these updates has to deal with the conflict. In the prior art, the server may deal with this conflict by applying different conflict resolution procedures a posteriori, i.e. after receiving the updates. As a result the server which receives the updates needs to know about the resolution techniques.

When the updates are received by the LDAP servers themselves, they are capable of applying the resolution procedures to deal with potential conflicts. However, the updates may also be received by a client application of the directory such as billing applications, a reporting utility, a meta-directory connector or a filtering module. The external application does not always know about the conflict resolution techniques and may therefore be incapable of dealing with the conflict. Further, any directory client should never need to care about such a low-level of data publishing.

The invention addresses the above problems.

FIG. 6b shows an example of a directory server system having a multi-master topology. Such a directory server system comprises several master servers and slave servers. Each server of the multi-master topology stores directory server data representing a replica.

The multi-master topology of FIG. 6 comprises four master servers M1, M2, M3 and M4 which maintain a read-write replica and four slave servers C1, C2, C3 and C4 which maintain a read-only replica.

Each master server M1, M2, M3 or M4 can exchange replicate updates through update communications or replication sessions, with another master server, and can send replicate updates to slave servers C1, C2, C3 or C4 which are connected thereto.

The replicate updates comprise add, delete, modify, and modify DN operations.

In the prior art, the replication function used by a master server for replicating updates to another, e.g. M1 and M4, is the same as the one used by a master server for replicating a slave server or non-master server, e.g. M1 and C1.

If one master is unreachable for some period of time—due to hardware failure, software failure or network failure—the other master servers continue to accept updates and can replicate the updates to the read-only replicas.

Interactions occur between the servers, resulting in the transfer of updates from a supplier replica to a consumer replica.

Replication relationships, e.g, $L_{MC(11)}$, $L_{MC(22)}$, $L_{MC(23)}$, $L_{MC(31)}$, $L_{MC(33)}$, $L_{MC(34)}$ and $L_{MC(44)}$, may be established between the master servers M1, M2, M3, and M4 and the slave servers C1, C2, C3 and C4. $L_{mC}(Ik)$ designates an unidirectional replication relationship from master M1 to slave server Ck.

Each master server is capable of responding to read requests and update requests from a directory client. On receiving an update request form a client, it accordingly modifies an entry and then records the updates made in an update log or replication log.

Each master server may interact with the other master servers to replicate the updates made to the replica. Thus, as seen on FIG. 6b, master server M1 may interact with all the other masters M2, M3 and M4 in order to replicate its updates. Master server M1 would be acting in this case as a supplier server for the other master servers.

A master server may also receive replication updates from the other master servers, thus playing the role of consumer. Therefore, replication Relationships, e.g. $L_{MM(12)}$, $L_{MM(23)}$, $L_{MM(34)}$, $L_{MM(14)}$, $L_{MM(13)}$, and $L_{MM(24)}$, may be established between the master servers M1, M2, M3, and M4. $L_{MM(Ik)}$ designates a bidirectional relationship between master server M1 and master server Mk.

As a result, a given master server has a knowledge of the updates performed on the other master servers.

A replica of a master server comprises:
original updates, which have been locally created in the master server, and
replicate updates performed in the master server after receipt of update communications about other master servers replicas.

A replication log may be maintained by each master server for storing a history of the updates applied in its replica.

A replication log is a record that describes the modifications that have occurred on a replica. When an entry is modified, a change record describing the update that was performed, e.g. an LDAP operation, is recorded in the replication log. When playing the role of a supplier, the master server replays these modifications on the replicas stored on consumer servers and on other masters.

The replication log of a master server comprises for each update stored therein:
update data defining the update, which may be represented by a series of lines which specify the update to make, the replication site(s) and the DN of the entry being modified,
a master identifier identifying the master server in which that update was locally created, and
an update time indication representing the creation time at which the update was locally created.

In particular, the update time indication may both represents the creation time and identify the master server.

For example, each update may be attached an update time indication called the Change Sequence number CSN which represents the creation time. A CSN value is generated for each update made to an entry at the master server at which the update was created. A replication log is generally ordered according to the creation times represented by the CSNs attached to the updates.

A CSN is assigned to an update in the master server where the update was locally created. Thus, CSNs are only assigned in a master server to original updates performed in response to a client request, and afterwards are propagated with associated update data toward the other servers.

Further, a CSN attached to an update also comprises the master identifier which identifies the master server in which the update was locally created.

In particular, a CSN value may be formed of three components:
a time indication representing the creation time,
a change count, and
a Replica Identifier comprising the master identifier.
An additional reserved field may be provided.

Such CSN composition ensures the uniqueness of every generated CSN and therefore a CSN uniquely identifies an update. When CSNs are compared to determine their ordering they are compared component by component: first the time indication, then the change count, then the replica identifier and finally the above mentioned reserved field, when provided.

The time indication may be a year-2000-safe representation of the real world time, with a granularity of one second and indicates the creation time at which the update was locally created.

Because many updates, at a single replica, may be applied to the same data in a single second, the change count component of the CSN may be provided to further order the updates.

Each replica maintains a change count of the updates applied against it. The change count is reset to zero at the start of each second, and is increasing within that second, incremented for each and every update.

If updates occur at different replicas to the same data, within the same single second, and happen to be assigned the same change count number, then the Replica Identifier is used to further order the changes. The Replica Identifier is a unique identifier of a particular replica in the topology.

The above mentioned reserved field may be used as a modification number for ordering the LDAP update operations (e.g. "add", "delete") that are produced in the topology.

Therefore, a change sequence number ensures that:
two different master servers cannot create the same CSN, and
the CSN grows in time globally in the whole topology.

Thus, if a first change sequence number CSN1 from master M1 is smaller than a second change sequence number CSN2 from master M2, then the change associated to CSN1 is older than the change identified by CSN2.

In the following description, a change sequence number will be noted "CSNxxyy" where xx is the number of seconds since the topology was created and yy is an identifier of the master where the change was originated, to ease the comprehension of the invention. For example, CSN4701 indicates that the corresponding update was generated in master M1 at the $47^{th}$ second of history of the whole topology.

The following description will be made hereinafter in reference to a replication session between a master server and a slave server. To allow easier comprehension of the description, the expressions "supplier" or "supplier server" will designate a master server and the expressions "consumer" or "consumer server" will designate a slave server.

Consumers respond to read requests from a client but do not perform the update on their replica. Indeed, they refer update requests to a corresponding supplier server for the replica.

Any time a request to add, delete, or change an entry is received by a consumer, the request is referred to a supplier for the replica. The supplier, which is a master server connected thereto, performs the request and later replicates the update.

In the prior art, a master server executes a master-to-non-master function, or replication function, for replicating updates toward consumers. The replication function is based on target update state items maintained by the consumer which form a consumer replication update vector CRUV. Each item in the CRUV comprises a target time indication.

Generally, a replication update vector in a local server records the point to which a local replica has been updated. Master servers also comprise replication update vectors.

A replication update vector comprises a set of time indications, each one being associated to a distinct master server. Each time indication in the replication update vector represents the latest creation time amongst the updates replicated in the local server from original updates created in the associated master server.

The time indications stored in a replication update vector may have the same format as the update time indications contained in the replication log.

Thus, when the CSN parameter is used, a replication update vector comprises a set of CSN values, each one identifying a distinct master server. Therefore, each CSN value in the replication update vector identifies the most recent update locally known that was created in the master server identified by the CSN value. The description will be made thereinafter in reference to time indications defined by the Change Sequence Numbers, by way of example. Accordingly, the replication log and the replication update vectors will comprise CSNs as time indications.

An example of M1 replication update vector is given in exhibit E1.1 and an example of C1 replication update vector is given in exhibit E1.2 for consumer C1 at a particular moment in time.

Exhibit E1.1 shows that Master M1 knows up the changes of the topology until:
a change generated in the $34^{th}$ second from M2,
a change generated in the $87^{th}$ second from M3,
a change generated in the $54^{th}$ second from M4.

Master M1 also knows that the last change originated in Master M1 happened in the $47^{th}$ second.

Exhibit E1.2 indicates that the consumer server C1 knows up the changes of the topology until:
a change generated in the $22^{th}$ second from M1,
a change generated in the $30^{th}$ second from M2,
a change generated in the $81^{th}$ second from M3,
a change generated in the $54^{th}$ second from M4.

Referring to FIG. 7, a supplier server S interacts with its replica SDB, its replication log SRlog and its replicate update vector SRUV for performing a replication session toward a consumer server C, which interacts with its own replica CDB and its replication update vector CRUV.

According to the prior art, in order to determine the updates to send to a consumer C, supplier M determines the updates that the consumer needs to be sent. The consumer replication update vector CRUV provides information about the last replicate update locally created by each master server amongst the updates replicated to the consumer. Therefore, the supplier can use the CRUV to determine the consumer replication state.

FIG. 8a is a general diagram representing the supplier and consumer structures which are involved in a replication session, according to the prior art.

A supplier server S, has a master-to-slave function 46, or replication function, which is capable of replicating updates from the supplier to a consumer C connected thereto.

The replication function 46 uses the consumer replication update vector 44 of consumer C. More specifically, the replication function 46 interacts with a lower time builder 41 which determines a lower time value OU corresponding to the oldest update known by the consumer, and which transmits this lower time value to the replication function 46.

The replication function 46 then uses the oldest update time OU to determine the updates to send to the consumer from the replication log 48 and sends the determined updates to the consumer.

FIG. 8b is a flowchart representing the operations performed by a supplier server S for replicating updates towards a consumer C, according to the prior art. In the prior art, the replication function 46 is also used for replicating updates towards another master server.

At operation 12, supplier S initiates a replication session with consumer C.

As will be seen thereinafter, interactions occur between the two servers, resulting in the transfer of updates from the supplier replica to the consumer replica.

At operation 14, the supplier S connects to the consumer C and gets its replication update vector CRUV, which provides for example the replication update vector of exhibit E1.2.

With the data contained in the CRUV, the lower time builder 1 evaluates a lower time value or oldest update time OU. This oldest update time OU uniquely identifies an update, since each CSN in the CRUV is associated to an update.

The oldest update time OU corresponds to the earliest time indication among the CSNs in the CRUV. For example, in exhibit E1, the oldest update time OU is the time indication "22" represented by CSN2201.

From this oldest update time OU, the replication function 6 is then capable of determining the updates in the replication log to be sent to the consumer C.

More specifically, the replication function 46 performs operation 17 to fetch into the replication log the oldest update time OU provided by operation 16. The description thereinafter will be made in reference to a replication log where the updates are increasingly ordered from the update having the oldest CSN to the update having the youngest CSN.

Therefore, at operation 18, the replication function 46 gets the next update NU stored in the replication log.

If this next update NU exists, as determined at operation 19, the replication function 46 performs operation 20 to determine whether the consumer already knows the next update NU. If the consumer does not already know the next update NU, the supplier sends this update NU to the consumer, at operation 21, and then returns to operation 18. If the consumer already knew update NU, the supplier directly returns to operation 18.

If this next update NU does not exist, the replication session is stopped at operation 22. The replication function reiterates operations 18 to 21 until the end of the replication log.

Each update sent to consumer C1 comprises an update primitive that describes the state changes that have been made to a single entry.

A primitive includes sufficient data to allow recreation of corresponding state changes on the consumer's replica. Each update primitive contains a corresponding CSN. The Consumer receives the replicate updates, extracts the sequence of Update Primitives, and may apply them to the consumer replica in the order provided.

Once all the replicate updates have been sent to consumer C, consumer C will be up to date with respect to master M and their replication update vectors will be the same.

As a CSN value uniquely identifies an update and a creation time, the update or the creation time may be referred by the CSN value in the following description, for more clarity. For instance, "the update CSNxxyy" will mean the update identified by Csnxxyy and "the time CSNxxyy" will mean the time xx represented by CSNxxyy.

Applying the replication function to the example of exhibit E1, as the oldest update time OU known by consumer C1 is CSN2201, supplier M1 will send to consumer C1 all the updates of M1 replication log that are older than CSN2201. Thus, supplier M1 will send, among the others, the updates identified by the following set of CSNs:

CSN3402

CSN4701

CSN8703.

However, conflicts may occur with this replication process. Indeed, in the example of exhibit E1, when master M1 decides to send the update CSN8703, i.e., an update originated in the $87^{th}$ of the topology history in master M3, nothing ensures that master M1 will not receive an update from master M2, which would be conflicting with the update by CSN8703.

Master M1 only knows the history of updates performed by master M2 up to the $34^{th}$ of the topology history as indicated by the change sequence number CSN3402 of the supplier replication update vector. Therefore, master M1 cannot know whether an update has been generated between the $34^{th}$ second and the $87^{th}$ second in master M2. An update, for example CSN4002, which is conflicting with the update CSN8703 could have been generated in master M2, in this time interval.

In the prior art, if such a scenario occurred, a conflict resolution procedure would be used later in time when consumer C1 receives the update CSN4002 through a different replication session.

The invention proposes to deal with this conflict problem a priori, thus making it possible for consumers to receive updates without carrying about conflict resolution.

The invention proposes a master server having a master-to-slave function, or replication function, for replicating updates to a slave server while ensuring that no conflicting update may have been generated somewhere else in the topology during replication to the consumer.

FIG. 9 is a general diagram representing the supplier and consumer structures which are involved in a replication session, according to the embodiments of the invention.

Instead of replicating updates from the oldest update the consumer knows to the youngest update the supplier knows, like in the prior art, the replication function 460 may replicate updates from the supplier replication log 48, from the oldest update known by the consumer to a youngest update defined from an upper time value. This upper time value or maximum consistency point MCP is the point in time for which no older CSN may have been generated around the topology.

According to a main feature of the invention, the maximum consistency point MCP is derived from local update state items, thereinafter called extended replication update vector ERUV.

Each item in the extended replication update vector is associated to a respective master server and comprises an estimate time indication CSN'.

An estimate time indication CSN'(i) associated to a master Mi is related to update communications received by the local master server about the replicas stored by the associated master server Mi. In particular, the estimate time indications CSN' may be obtained from the supplier replication update vector SRUV.

The estimate time indications may have the same format as the time indication in the replication log and as the CSN parameter, even if they are not required to identify an update.

According to an aspect of the invention, the master server may further have an update state builder for evaluating the extended replication update vector.

A master server M according the invention comprises a replication function 460 which is capable of sending to the consumer those of the updates in the local replica which meet a time condition.

The replication function 460 may interact with a lower time builder 41, as defined in the prior art and with an upper time builder 49.

The upper time builder 49 uses the extended replication update vector 420 to provide the consistency point MCP to the replication function 460.

The lower time builder 41 receives the data contained in the consumer replication update vector 44 to provide the oldest update time OU to the replication function.

According to the embodiments of the invention, the replication function 460 selects the updates from the supplier replication log 48 which meet a time condition, including an upper time condition which is based on the maximum consistency point MCP provided by the upper time builder 49.

Additionally, the time condition may also include a lower time condition which is based on the oldest update time OU provided by the lower time builder 1.

The selected updates are finally sent to consumer C, according to LDAP replication protocol.

FIG. 10 is a flowchart representing the operations performed by supplier server S for replicating updates towards consumer C, according to the embodiments of the invention.

At operation 100, the replication session is started between supplier M and consumer C. The upper time builder 49 then gets at operation 102 the extended replication update vector 420. The extended replication update vector 420 is maintained by the update state builder.

The upper time builder 49 then evaluates the maximum consistency point MCP as the earliest one of the estimate time indications CSN' in the extended replication update vector, at operation 104.

At operation 106, the supplier may connect to the consumer and get the consumer replication update vector CRUV.

The lower time builder 1 uses the CRUV to determine, at operation 108, the oldest update time OU in the CRUV, like in the prior art.

The replication function 460 then performs operation 110 to fetch into the replication log 48 the oldest update time OU provided by operation 108. At operation 112, the supplier gets the next update NU stored in the replication log.

At Operation 114, the replication function determines whether next update NU meets the upper time condition, which comprises the fact that NU has an associated creation time which is no later than the maximum consistency point MCP. This can be made by comparing NU and MCP.

If so, the replication function 460 performs operation 116 to determine whether the consumer already knows next update NU. If the consumer does not know next update NU, the replication function performs operation 117 to send the next update NU to the consumer and then returns to step 112. Otherwise, it directly returns to step 112.

If NU does not meet the upper time condition, at test 114, the supplier stops the replication session at operation 118. Otherwise, the supplier iterates operations 112 to 117 until the end of the replication log or until test 114 fails, while sending to the consumer all the updates it finds.

By iteratively processing the updates of the replication log from the oldest update time OU, the replication function 460 ensures that the updates sent also meet the lower time condition which comprises the fact that an update has a creation time which is no earlier than the oldest update time OU.

The Consumer receives the replicate updates, extracts the sequence of Update Primitives, and may apply them to its replica in the order provided.

According to a first embodiment of the invention, each estimate time indication CSN'(i) in the extended replication update vector being associated to a master server Mi may be related to a first time indication representing the latest creation time amongst the updates replicated in the local master server from original updates created in master server Mi, i.e. the CSN associated to that master server Mi in the supplier replication vector SRUV.

Thus the first time indication values form a CSN vector which comprises all the CSN values of the Supplier Replication Update Vector, except the CSN value associated to the local master server.

In particular, the extended replication update vector 420 is directly defined by this CSN vector which can be obtained from the supplier replication update vector, so that each estimate time indication CSN'(i) associated to a master server Mi is attached the value CSN(i).

For instance, in the example of Exhibit E1.3, the extended replication update vector comprises the estimate time indications CSN3402, CSN8703, and CSN5404.

The update state builder may have a first time indication storage for storing the CSN vector from the supplier replication update vector. The CSN values in the supplier replication update vector may be maintained by scanning the replication log.

When the supplier replication update vector structure is not used, the update state builder may directly maintain the CSN vector by scanning the replication log.

Accordingly, the replication function 460 may determine the Maximum consistency point, at operation 104, by determining the time indication which represents the lowest creation time, among the CSN values in the extended replication update vector.

In the example of exhibit E1, the maximum consistency point known by the supplier would thus be identified by CSN3402, as it has the earliest creation time in the extended replication vector of exhibit E1.3. Replicating updates up to the maximum consistency point CSN3402 ensures that the consumer will not receive in the future conflicting updates.

When the replication session from master M1 is stopped after sending CSN3402, the replicas of consumer C1 become conflictless and any client application reading the data from consumer C1 is ensured that the data read is free of any conflict.

However, in some cases the first embodiment of the invention may have some limits. In particular, if the client did not address update requests to master M2 anymore, the maximum consistency point would remain CSN3402, and therefore no other update would flow from master M1 to consumer C1. This would involve a growing divergence between the master replicas and the consumer replicas.

If however master M2 received back again an update in the future, the updates to be sent to the consumers would be tremendous, thus causing an important replication peak traffic.

A second embodiment of the invention will be described thereinafter which does not present such limits.

In the second embodiment of the invention, each estimate time indication CSN'(i) in the extended replication update vector being associated to a master server Mi is related to a second time indication TMC(i) which represents the latest update communication received by the local master server from master server Mi.

The update state builder may store the second time indications in a second time indication storage, or Theoric Maximum Field vector thereinafter called TMC vector.

A TMC value in the TMC vector may have the same format as the change sequence number CSN, even if it does not identify an update. In the following description TMC value will be represented in the CSN format, by way of example.

In a fully meshed multi-master topology, the update state builder may maintain the TMC vector based on the direct update communications between the local master server and the other master servers.

Alternatively, in a partially meshed multi-master topology, the update state builder may maintain the TMC vector based on direct update communications between the local master server and the master servers connected thereto, as well as on indirect update communications between the local master server and the master servers non-connected thereto.

The description of the second embodiment of the invention will be firstly made in reference to a fully meshed multi-master topology, where a local master server can receive direct update communications from all the other master servers.

An example of a TMC vector, according to the second embodiment of the invention is shown in exhibit E2.1. The second column in each row represents the TMC vector and comprises a TMC value for each existing master server. This TMC vector of master M1 indicates that:

the last replication session from M2 to M1 occurred in the 88$^{th}$ second (CNS8802);

the last replication session from M3 to M1 occurred in the 87$^{th}$ second (CNS8703);

the last replication session from M4 to M1 occurred in the 86$^{th}$ second (CNS8604);

M1 has not a TMC value associated with itself as M1 is always "contacted" itself.

A TMC(i) value is updated in the TMC vector, when the local master server receives an update communication from master server Mi. An update communication may be limited to a replication start request and to a replication end request, with no updates being sent.

Typically, in a multi-master topology, the maximum elapsed time between two replication sessions never exceeds 5 minutes, even when no data to replicate is available. Therefore, since all masters in a multi-master topology are both suppliers and consumers, each master server will receive a replication start request from all the other master servers at least once each 5 minutes.

The expression "remote master server" will be used thereinafter to designate another master server acting as a supplier for the local master server (which therefore acts as a consumer).

A TMC(i) value may be computed by the remote master server Mi which attempts a replication session and then sent to the local master server, in which the local update state builder may refresh the local TMC(i) value. The expression "Attempting a replication session" designates the transmission of update communications and may be limited to a replication start request and a replication end request.

Alternatively, the TMC value may be directly computed by the local update state builder based on the time at which the replication start request was received and on a correction factor taking into account the transmission delays between the remote master server Mi and the local master server.

The TMC vector will be read when the local master server acts as a supplier for a "conflictless" consumer server. Master servers are not conflictless consumers since master servers are always ready to accept all changes from the other masters of the topology.

The TMC vector maintained by the update state builder may be used by the replication function to determine the maximum consistency point MCP according to the second embodiment of the invention, at operation 104 in the flowchart of FIG. 10.

In particular, the estimate time indications CSN' in the extended replication update vector may be obtained by both the first indications CSN from the CSN vector, and the second time indication from the TMC vector.

More specifically, whether the multi-master topology is fully meshed or not, the update state builder may evaluate each estimate time indication CSN'(i) associated to a master server Mi in the extended replication vector as the latest one of CSN(i) and TMC(i).

In the example of Exhibit E2.1, the CSN vector in the first column is the one obtained in Exhibit E1.3 from the supplier replication update vector of Exhibit E1.1. The CSN vector, in the first column and the TMC vector, in the third column, provide the following information:

M1 knows until a change generated in the 34$^{th}$ second from M2 (CSN3402). The last replication session from M2 to M1 occurred in the 88$^{th}$ second (CNS8802);

M1 knows until a change generated in the 87$^{th}$ second from M3 (CSN8703). The last replication session from M3 to M1 occurred in the 87$^{th}$ second (CNS8703);

M1 knows until a change generated in the 54$^{th}$ second from M4 (CSN5404). The last replication session from M4 to M1 occurred in the 86$^{th}$ second (CNS8604);

The TMC vector gives a supplementary information which can be used to improve the performance of conflictless replication. For instance, the fact that M2 last initiated a replication session to M1 in the 88$^{th}$ second (TMC value) while the last update replicated to M1 from M2 was performed at the 34$^{th}$ second (CSN value), indicates that M2 has not created any original update between the 34$^{th}$ and the 88$^{th}$ second. Therefore, M2 cannot have created any update during this period which would be conflicting with any other update of the whole topology.

FIG. 11 is a flowchart describing the operation performed by the update state builder for evaluating the extended replication update vector, according to the second embodiment of the invention.

For each CSN(i) value from the CSN vector and TMC(i) value from the TMC vector attached to the same master server Mi, the replication function determines at operation 1040 whether the creation time identified by CSN(i) is higher than the time identified by TMC(i) to generate the corresponding estimate time indication CSN'(i) attached to master server Mi in the extended replication update vector.

If the test 1040 succeeds, CSN(i) value is affected to CSN'(i) in the extended replication update vector at operation 1042.

Otherwise, TMC(i) value is affected to CSN'(i) in the extended replication update vector, at operation 1046.

Then the supplier iterates operations 1040 to 1046 for each TMC(j) and CSN(j) values both attached to another master server j, until all the values in the CSN vector and in the TMC vector have been processed (test 1047).

For example, the application of operations 1040 to 1047 to the vectors of Exhibit E2.1 results in the extended replication update vector of the fourth column.

Accordingly, when the local master performs a replication session toward a slave server, the replication function 460 will be capable of determining the estimate time indication which represents the lowest creation time, among the estimate time indications CSN' in the extended replication update vector, thus providing the maximum consistency point MCP.

In the above example, the maximum consistency point MCP is defined by CSN8604. Master server M1 does not participate in the computation of its own maximum consistency point MCP, as it is "always updated by itself" at any moment.

Exhibit E2.2 represents the consumer replication update vector before replication. The oldest update time OU is then CSN2201 and as a result the time condition may further comprise the fact that an update was created after the 22$^{th}$ second of history in the whole topology.

Therefore, master server M1 will send the updates applied to the master replica which meet the time condition, namely the updates which have a creation time comprised between the 22$^{nd}$ second and the 86$^{th}$ second of history in the whole topology.

The replication process between suppliers and conflictless consumers, according to the second embodiment of the invention, becomes very reactive to updates. Any update in the topology will be free of conflicts to any conflictless consumer at worst five minutes after it was first performed. This maximum threshold in time increases the replication process reactivity, smooths the traffic rate removing all peak risks and contributes to an overall higher performance and scalability.

However, each TMC related to an existing master server in the local TMC vector needs to be updated whenever the existing master server attempts a replication session toward the master server. As a result, each master server has to be connected to all the other existing master servers inside the network topology (fully-meshed topology).

FIG. 12 represents an example of a fully-meshed multi-master topology in which the second embodiment of the invention could be implemented. This topology comprises four master servers M1, M2, M3 and M4 and a conflictless consumer server C. The master servers M1, M2, M3 and M4 are interconnected, via links $L_{12}$, $L_{24}$, $L_{23}$, $L_{34}$, $L_{13}$ and $L_{14}$. For the sake of clarity, the links from M4 to M1, from M4 to M2 and from M4 to M3 are not represented. The description thereinafter will focus on server M4.

Whenever one of the other master servers M1, M2 or M3 attempts a replication session toward M4, it updates the corresponding TMC in the TMC vector of master server M4. Thus, master server M4 receives, at different times, a new TMC1 value from master server M1, a new TMC2 value from master sever M2, and a new TMC3 value from master server M3. As seen above, no TMC4 value is generated from master M4 itself as M4 is always contacted itself.

Therefore, master M4 stores a TMC vector containing TMC1, TMC2 and TMC3 values, which are intermittently updated. According to the second embodiment of the invention, M4 will use the stored TMC vector when replicating updates to the conflictless consumer server C, via the connection $L_{4C}$.

For good performances, the consumer C should be identically connected to master server M1 via link $L_{1C}$, to master server M2 via link $L_{2C}$ and to master server M3 via link $L_{3C}$. Therefore, the multi-master topology needs to be fully meshed for good performances, according to the second embodiment of the invention. In some wide-area network topologies using a great number of multi-master servers, administrators would plan to have a single link between some master servers to minimize network traffic for instance.

The further alternative of the second embodiment of the invention is proposed for use in a partially meshed topology. As seen above, according to the further alternative of the second embodiment, the update state builder may maintain the TMC vector based on direct as well as indirect update communications between the local master and the other masters.

According to the second embodiment of the invention described above, for use in a fully meshed multi-master topology, when a remote master server, directly connected to the local master server, attempts a replication session toward a local master server, only the TMC value corresponding to the supplier master server is updated, in the local TMC vector.

According to the further alternative of the second embodiment of the invention, when a remote master attempts replication toward a local master, the whole TMC vector of the remote master server is now updated, as will be described thereinafter.

More specifically, when the remote master sends a replication start request to the local master server, it may also send its own TMC vector TMCV_rem. The local master server is capable of receiving this TMC vector from the remote master server upon receiving an update communication from it.

A TMC vector contains a number of TMC values, each corresponding to an existing master server of the topology. On receiving an update communication from the remote master server, the local update state builder refreshes each TMC(i) value associated to a master server Mi in the local TMC vector TMCV_loc with the latest one of:
 the corresponding TMC(i) value in the TMCV_rem,
 the corresponding TMC(i) value in the local TMCV_loc.

According to the further alternative embodiment of the invention, the value TMC(r) associated to the remote master server Mr is still updated, like in full-meshed topologies, i.e. so as to indicate a time related to the latest replication attempt from the remote master server toward the local server.

FIG. 13 is a flowchart illustrating the operations performed by the update state builder of the local master server, or local update state builder, for updating the local TMC vector based on the TMC vector TMCV_rem received from the remote master server in response to a replication attempt from the remote master server.

On receiving the TMC vector TMCV_rem from the remote master at operation 200, the local update state builder performs operation 202 to get the TMC value associated to the first master server TMC_rem (0) in the received TMCV_rem. The update state builder also performs operation 204 to get the TMC value associated to that first master server TMC_loc (0) in its own TMC vector, TMCV_loc.

The local update state builder then performs the comparison operation 206 for comparing TMC_rem(0) provided by operation 202 and TMC_loc(0) provided by operation 204. If TMC_rem(0) is higher than TMC_loc(0), then the local update state builder replaces TMC_loc(0) by TMC_rem(0) in its local TMC vector, at operation 208.

Operations 202 through 208 are repeated for each master server Mi to compare TMC_rem(i) of the TMC vector received from the remote master and TMC_loc(i) of the local TMC vector. After each iteration of operations 202 through 208, index i is checked at operation 210 to determine whether all the TMCs have been processed, i.e. whether i=N, where N is the number of master servers in the remote TMC vector. If so, the local update state builder ends the process at operation 214. Otherwise, another iteration of operations 202 through 208 is performed, i.e. i=i+1.

As a result, the master servers of the multi-master topology share with each other their knowledge of the global state of the topology. This alternative of the second embodiment makes it possible for any master server to keep track of the TMCs of all the existing master servers in the topology without the need of being physically connected to them, as may be seen at FIG. 14.

In FIG. 14, master server M4 updates its TMC vector whenever it is contacted by a remote master M1, M2, M3 or M4 for a replication session, in which case it receives the whole TMC vector of the remote master as described above. Master M4 will use its TMC vector for a replication session toward the conflictless consumer C, according to the flowcharts 10 and 11 of the second embodiment.

Accordingly, consumer C may only be connected to master M4 via link $L'_{14}$. Further, the connections between master servers can be reduced. In FIG. 14, the links represented with dotted lines $L'_{13}$, $L'_{12}$, $L'_{24}$ are now optional and the links represented in continuous lines $L'_{23}$, $L'_{34}$ and $L'_{14}$ are sufficient to propagate the TMC vectors.

Thus, if a given master server, e.g. M2, is not directly connected to the local master server M4, but is directly connected to a remote master server, e.g. M3, which is directly connected to the local master server M4, it will be able to send information TMC2 about the last update communication it attempted, via the remote master M3, toward M4.

Exhibit E1—Examples of replication update vectors
 E1.1—M1 Replication Update Vector (SRUV)

| | SRUV |
|---|---|
| M1 | CSN4701 |
| M2 | CSN3402 |
| M3 | CSN8703 |
| M4 | CSN5404 |

E1.2—Consumer Replication Update Vector (CRUV) before Replication

| | CRUV |
|---|---|
| M1 | CSN2201 |
| M2 | CSN3002 |

-continued

|    | CRUV    |
|----|---------|
| M3 | CSN8103 |
| M4 | CSN5404 |

E1.3-M1 Extended Replication Update Vector, According to the First Embodiment of the Invention

|    | CSN'    |
|----|---------|
| M1 | —       |
| M2 | CSN3402 |
| M3 | CSN8703 |
| M4 | CSN5404 |

Exhibit E2—Examples of replication update vectors

E2.1—M1 Extended Replication Update Vector according to the Second Embodiment of the Invention

|    | CSN     | TMC     | CSN'    |
|----|---------|---------|---------|
| M1 | —       | —       | —       |
| M2 | CSN3402 | CSN8802 | CSN8802 |
| M3 | CSN8703 | CSN8703 | CSN8703 |
| M4 | CSN5404 | CSN8604 | CSN8604 |

E2.2—Consumer Replication Update Vector (CRUV) before Replication

|    | CRUV    |
|----|---------|
| M1 | CSN2201 |
| M2 | CSN3002 |
| M3 | CSN8103 |
| M4 | CSN5404 |

The invention claimed is:

1. A master server, for use in a directory server system having other master servers and a non-master server, each server configured to store directory server data, comprising updates, each update having a creation time, the master servers configured to exchange replicate updates through update communications, said master server compnsing:
an update state builder configured to maintain local update state items, each item being associated to a designated master server and comprising an estimate time indication related to update communications received by the local master server about the directory server data stored by the designated master server,
an upper time builder configured to evaluate an upper time value, said upper time value being the earliest one of the estimate time indications in the local update state items, and
a master-to-non-master replicate function, configured to send to the non-master server those of the updates in the local directory server data which meet a time condition, said time condition including an upper time condition which comprises the fact that an update has an associated creation time which is no later than the upper time value such that those updates in the local directory server data that have an associated creation time later than the upper time value are not sent to the non-master server.

2. The master server of claim 1, wherein the directory server data comprises:
original updates, which have been locally created in the master server at their respective creation time, and
replicate updates performed in the master server after receipt of update communications about the directory server data stored by the other master servers.

3. The master server as claimed in claim 2, wherein the update state builder is configured to derive the estimate time indication of each item being associated to a designated master server from update communications received by the local master server about original updates of the directory server data stored by the designated master server.

4. The master server of claim 3, wherein the update state builder is configured to derive the estimate time indication of each item being associated to a designated master server from a first time indication representing the latest creation time amongst the updates replicated in the local master server from said original updates.

5. The master server as claimed in claim 4, wherein the update state builder is configured to derive the estimate time indication of each item being associated to a designated master server from a second time indication representing the latest update communication received by the local master server from the designated master server.

6. The master server as claimed in claim 5, wherein the update state builder is configured to evaluate the estimate time indication of each item being associated to a designated master server as the earliest one of the first time indication and the second time indication.

7. The master server as claimed in claim 6, wherein the master server has an update log for storing history of the updates applied in its directory server data, the master-to-non-master function being capable of selecting the updates to send from the update log.

8. The master server of claim 7, wherein each update of the update log comprises:
update data defining the update,
an update time indication representing the creation time at which the update was locally created.

9. The master server as claimed in claim 8, wherein the update log is ordered according to the update time indications.

10. The master server as claimed in claim 8, wherein the update time indications in the update log have the same format as the first time indications.

11. The master server as claimed in claim 8, wherein the update time indications in the update log have the same format as the second time indications.

12. The master server as claimed in claim 7, wherein the update state builder may evaluate the first time indications by scanning the update log.

13. The master server as claimed in claim 7, wherein said local master server is adapted to firstly receive target update state items from the non-master-server, each target update state item being associated to a designated master server and comprising a target time indication, representing the latest creation time amongst the updates replicated in the non-master server from original updates created in the designated master server, and the local master server further has a lower time builder capable of evaluating a lower time value, said lower time value being the earliest target time indication in the target update status items, said time condition further comprising a lowest time condition, which comprises the fact that an update has an associated creation time which is no earlier than the lower time value.

14. The master server as claimed in claim 13, wherein the update time indications in the update log have the same format as the target time indications in the target update state items.

15. The master server as claimed in claim 5, wherein the update state builder has a second time indication storage for storing the second time indications, each second time indication associated to a designated master server being refreshed, in response to the receipt of an update communication in the local master server from said designated master server, with a time related to that update communication.

16. The master server of claim 15, for use in a local master server configured to receive the second time indications of a remote master server upon the receipt of an update communication from the remote master server, wherein the update state builder is further responsive to the receipt of an update communication from the remote master server, for refreshing each second time indication being associated to a designated master server amongst the local second time indications, with the latest one of:
the second time indication associated to said designated master server amongst the second time indications received from said remote master server,
the second time indication associated to said designated master server amongst the second time indications associated to said designated master server amongst the local second time indications.

17. The master server as claimed in claim 4, wherein the update state builder has a first time indication storage for storing the first time indications, the first time indication storage being refreshed in response to an update being applied in the directory server data.

18. A method of operating a master server in a directory server system, having other master servers and a non-master server,
each server configured to store directory server data, comprising updates, each update having a creation time,
the master servers configured to exchange replicate updates through update communications,
each master server comprising local update state items, in which each item is associated to a designated master server and comprises an estimate time indication related to update communications received by the local master server about the directory server data stored by the designated master server, the method comprising the steps of:
a) evaluating an upper time value as the earliest one of the estimate time indications in the local update state items, and
b) sending to the non-master server those of the updates in the local directory server data which meet a time condition, said time condition including an upper time condition which comprises the fact that an update has an associated creation time which is no later than the upper time value such that those updates in the local directory server data that have an associated creation time later than the upper time value are not sent to the non-master server.

19. The method of claim 18, wherein the directory server data comprises:

original updates, which have been locally created in the master server at their respective creation time, and
replicate updates performed in the master server after receipt of update communications about the directory server data stored by the other master servers.

20. A method of operating a master server in a directory server system, having other master servers and a non-master server,
each server configured to store directory server data, comprising updates, each update having a creation time,
the master servers configured to exchange replicate updates through update communications,
each master server comprising local update state items, in which each item is associated to a designated master server and comprises an estimate time indication related to update communications received by the local master server about the directory server data stored by the designated master server,
the method comprising the steps of:
a) evaluating an upper time value as the earliest one of the estimate time indications in the local update state items, wherein step a) comprises a preliminary step of:
 i) deriving the estimate time indication of each item being associated to a designated master server from update communications received by the local master server about original updates of the directory server data stored by the designated master server, and
b) sending to the non-master server those of the updates in the local directory server data which meet a time condition, said time condition including an upper time condition which comprises the fact that an update has an associated creation time which is no later than the upper time value.

21. The method of claim 20, wherein said step i) comprises deriving the estimate time indication of each item being associated to a designated master server from a first time indication representing the latest creation time amongst the updates replicated in the local master server from said original updates.

22. The method as claimed in claim 21, wherein step a) comprises:
determining the estimate time indication of each item being associated to a designated master server from a second time indication representing the latest update communication received by the local master server from the designated master server.

23. The method as claimed in claim 22, wherein step a) comprises evaluating the estimate time indication of each item being associated to a designated master server as the earliest one of the first time indication and the second time indication.

24. The method as claimed in claim 20, wherein the master server comprises an update log for storing a history of the updates applied in its directory server data, wherein step b) further comprises selecting the updates to send from the update log.

25. The master server of claim 24, wherein step a) further comprises scanning the update log.

26. The method as claimed in claim 24, wherein the master server is configured to receive target update state items from the non-master server,
each target update state item being associated to a designated master server and comprising a target time indication, representing the latest creation time amongst the updates replicated in the non-master server from original updates created in the designated master server, wherein step a) further comprises evaluating a lower time value as the earliest target time indication in the target update status items, and said time condition further comprises a lowest time condition, which comprises the fact that an update has an associated creation time which is no earlier than the lower time value.

27. The master server of claim 26, wherein each update of the update log comprises an update time indication representing the creation time at which the update was locally created, said update log being increasingly ordered according to the update time indications, wherein step b) comprises:

b1) fetching in the update log the update whose creation time matches the lower time value, b2) fetching the next update in the update log, b3) checking whether the non-master has already received said next update, if not sending that next update to the non-master, and b4) checking whether the next update has a creation time that is no later than the upper time value, and if not repeating steps b2) through b4).

* * * * *